US009948202B2

(12) United States Patent
Takahashi et al.

(10) Patent No.: US 9,948,202 B2
(45) Date of Patent: Apr. 17, 2018

(54) TRANSFORMER MODULE, POWER RECEPTION DEVICE AND POWER TRANSMISSION DEVICE

(71) Applicant: Murata Manufacturing Co., Ltd., Nagaokakyo-shi, Kyoto-fu (JP)

(72) Inventors: Hironobu Takahashi, Nagaokakyo (JP); Tsutomu Ieki, Nagaokakyo (JP); Fumikiyo Kawahara, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 210 days.

(21) Appl. No.: 14/806,698

(22) Filed: Jul. 23, 2015

(65) Prior Publication Data

US 2015/0326141 A1 Nov. 12, 2015

Related U.S. Application Data

(63) Continuation of application No. PCT/JP2013/079490, filed on Oct. 31, 2013.

(30) Foreign Application Priority Data

Feb. 6, 2013 (JP) .................................. 2012/021010

(51) Int. Cl.
*H01F 5/00* (2006.01)
*H01F 27/29* (2006.01)
(Continued)

(52) U.S. Cl.
CPC ............... *H02M 7/06* (2013.01); *H01F 5/00* (2013.01); *H01F 27/2804* (2013.01);
(Continued)

(58) Field of Classification Search
CPC ..................... H01F 5/00; H01F 27/00–27/36
(Continued)

(56) References Cited

U.S. PATENT DOCUMENTS

| 3,470,444 | A | * | 9/1969 | Bixby | ..................... G05F 1/455 363/101 |
| 2005/0226008 | A1 | * | 10/2005 | Harada | ............... H02M 3/3353 363/15 |
| 2014/0313788 | A1 | * | 10/2014 | Okubo | .................... H02M 1/12 363/21.01 |

FOREIGN PATENT DOCUMENTS

| JP | S63-6715 U | 1/1988 |
| JP | H08-29114 U | 4/1994 |

(Continued)

OTHER PUBLICATIONS

International Search Report issued for PCT/JP2013/079490, dated Feb. 4, 2014.

(Continued)

*Primary Examiner* — Tuyen Nguyen
(74) *Attorney, Agent, or Firm* — Arent Fox LLP

(57) ABSTRACT

A circuit module equipped with a primary coil of a step-down transformer formed by primary coils of a plurality of transformer elements connected in series with each other and a secondary coil formed by secondary coils of the transformer elements connected in series with each other, includes a printed substrate on which the transformer elements are mounted in a lengthwise direction, a connection terminal coupled to a first end of the primary coil of the step-down transformer and connection terminals coupled to the secondary coil of the step-down transformer, the connection terminals are positioned such that the transformer elements are interposed therebetween. As a result, provided are a transformer module that reduces the effect of a high-voltage portion on a low-voltage portion by securing a distance between the high-voltage portion and the low-voltage portion, and a power reception device and a power transmission device equipped with the transformer module.

12 Claims, 16 Drawing Sheets

(51) Int. Cl.
*H02M 7/06* (2006.01)
*H02M 7/44* (2006.01)
*H01F 27/28* (2006.01)
*H02J 7/02* (2016.01)
*H02J 50/12* (2016.01)
*H01F 30/00* (2006.01)
*H01F 27/06* (2006.01)

(52) U.S. Cl.
CPC ............ *H01F 27/29* (2013.01); *H01F 30/00* (2013.01); *H02J 7/025* (2013.01); *H02J 50/12* (2016.02); *H02M 7/44* (2013.01); *H01F 2027/065* (2013.01)

(58) Field of Classification Search
USPC ............... 336/65, 83, 200, 206–208, 232
See application file for complete search history.

(56) References Cited

FOREIGN PATENT DOCUMENTS

| | | |
|---|---|---|
| JP | 07023563 A * | 1/1995 |
| JP | H08-279592 A | 10/1996 |
| JP | 2000-228312 A | 8/2000 |
| JP | 2010-148241 A | 7/2010 |
| JP | 2012-080011 A | 4/2012 |
| WO | WO 2012/086411 A1 | 6/2012 |

OTHER PUBLICATIONS

Written Opinion of the International Searching Authority issued for PCT/JP2013/079490, dated Feb. 4, 2014.

* cited by examiner

TRANSFORMER MODULE, POWER RECEPTION DEVICE AND POWER TRANSMISSION DEVICE

CROSS-REFERENCE TO RELATED APPLICATIONS

The present application is a continuation of PCT/JP2013/079490 filed Oct. 31, 2013, which claims priority to Japanese Patent Application No. 2012-021010, filed Feb. 6, 2013, the entire contents of each of which are incorporated herein by reference.

FIELD OF THE INVENTION

The present invention relates to a transformer module formed of a plurality of transformers and to a power reception device and a power transmission device equipped with the transformer module.

BACKGROUND OF THE INVENTION

An electric field coupling scheme is known as a system in which power is wirelessly transmitted from a power transmission device to a power reception device. In such an electric field coupling scheme power transmission system, power is transmitted from an active electrode of the power transmission device to an active electrode of the power reception device via an electric field. In order to increase the power transmission efficiency, high-voltage transmission is performed by providing a voltage-boosting circuit in the power transmission device and a voltage-lowering circuit in the power reception device. An example of a power reception device is a mobile electronic appliance such as a cellular phone device and with the continuing progress being made in reducing the thickness and size of mobile electronic appliances in recent years, there have also been demands for reductions in the thickness and size of built-in components. Consequently, there is a need for high-withstand-voltage transformers designed to be small and have a low profile.

In Patent Document 1, an invention is disclosed that relates to a high-frequency transformer for high voltage and large current use. The high-frequency transformer according to Patent Document 1 has a configuration in which it is possible to connect primary windings and secondary windings of a plurality of transformers in series or in parallel with each other. With this configuration, the transformation ratio of the transformer can be adjusted and it is possible to handle both a case where low-voltage large-current high-frequency power is to be output and a case where high-voltage small-current high-frequency power is to be output.

Patent Document 1: Japanese Unexamined Patent Application Publication No. 2012-80011.

In the case of the electric field coupling scheme power transmission system, since there is a demand for reduction of the thickness of a power reception device as described above, there are restrictions on the space in which to arrange components to be built into the power reception device. Consequently, there is a problem in that noise generated by high-voltage portions and so forth affects low-voltage portions because it is not possible to secure a sufficient distance between the components. In Patent Document 1, a high-withstand-voltage transformer can be realized by adjusting the transformation ratio of the transformer, but the above-described problem cannot be solved.

SUMMARY OF THE INVENTION

Accordingly, an object of the present invention is to provide a transformer module that reduces the effect of a high-voltage portion on a low-voltage portion by securing a distance between the high-voltage portion and the low-voltage portion, and to provide a power reception device and a power transmission device equipped with the transformer module.

A transformer module according to the present invention equipped with a primary winding group in which primary windings of a plurality of transformers are connected in series or parallel with each other and a secondary winding group in which secondary windings of the plurality of transformers are connected in series or parallel with each other, includes a substrate on which the plurality of transformers are arranged and mounted in one direction, a 1st input portion that is provided on the substrate and to which a 1st end of the primary winding group is connected, and a 1st output portion and a 2nd output portion that are provided on the substrate and to which a 1st end and a 2nd end of the secondary winding group are connected, the 1st input portion, and the 1st output portion and the 2nd output portion being provided at positions such that the plurality of transformers are interposed between the 1st input portion, and the 1st output portion and the 2nd output portion.

With this configuration, the distance between the 1st end of the primary winding group and the secondary winding group of the transformer module can be secured as at least the size of a region in which the plurality of transformers are mounted. Thus, in the case where the primary side of the transformer module is a high-voltage portion and the secondary side is a low-voltage portion, it is possible to arrange the high-voltage portion and the low-voltage portion so as to be separated from each other, and as a result the effect of noise generated by the high-voltage portion and so forth on the low-voltage portion can be reduced.

Furthermore, by forming the primary winding group and the secondary winding group of the transformer module by connecting the primary windings and the secondary windings of the transformers in series or parallel with each other, the transformer capacity of the transformer module can be adjusted. Accordingly, even if small (low profile) transformers are used, a situation in which the transformer module has an insufficient transformer capacity can be avoided and size reduction (profile reduction) can be realized for the transformer module.

It is preferable that the transformer module further include a 2nd input portion that is provided on the substrate and to which a 2nd end of the primary winding group is connected, the 2nd input portion being provided at a position such that the plurality of transformers are interposed between the 2nd input portion and the 1st input portion.

With this configuration, a distance can be secured between the 1st end and the 2nd end of the primary winding group. Consequently, an end of the primary winding group on the high-voltage side and the other end on the reference potential side can be arranged so as be separated from each other and as a result the effect of noise generated by a high-voltage portion and so forth on a low-voltage portion can be suppressed.

The transformer module may further include a 2nd input portion that is provided on the substrate and to which a 2nd end of the primary winding group is connected, the 2nd input portion being provided at a position such that the plurality of transformers are interposed between the 2nd input portion, and the 1st output portion and the 2nd output portion.

With this configuration, the two ends of the primary winding group can be arranged close to each other and therefore mounting of the input terminals of the transformer module is easier.

A transformer module according to the present invention equipped with a primary winding group in which primary windings of a plurality of transformers are connected in series or parallel with each other and a secondary winding group in which secondary windings of the plurality of transformers are connected in series or parallel with each other, includes a substrate on which the plurality of transformers are arranged and mounted in m (m being an integer of 2 or more) rows and n (n being an integer of 2 or more) columns, a 1st input portion that is provided on the substrate and to which a 1st end of the primary winding group is connected, and a 1st output portion and a 2nd output portion that are provided on the substrate and to which a 1st end and a 2nd end of the secondary winding group are connected, the 1st input portion, and the 1st output portion and the 2nd output portion being provided at positions such that a transformer mounting region in which the plurality of transformers are mounted is interposed between the 1st input portion, and the 1st output portion and the 2nd output portion and such that there is a maximum distance between the 1st input portion, and the 1st output portion and the 2nd output portion.

With this configuration, the distance between the 1st end of the primary winding group and the secondary winding group of the transformer module can be secured as at least the size of a region in which the plurality of transformers are mounted. Thus, in the case where the primary side of the transformer module is a high-voltage portion and the secondary side is a low-voltage portion, it is possible to arrange the high-voltage portion and the low-voltage portion so as to be separated from each other, and as a result the effect of noise generated by the high-voltage portion and so forth on the low-voltage portion can be suppressed.

Furthermore, by forming the primary winding group and the secondary winding group of the transformer module by connecting the primary windings and the secondary windings of the transformers in series or parallel with each other, the transformer capacity of the transformer module can be adjusted. Accordingly, even if small (low profile) transformers are used, a situation in which the transformer module has an insufficient transformer capacity can be avoided and size reduction (profile reduction) can be realized for the transformer module.

The transformer module may further include a 2nd input portion that is provided on the substrate and to which a 2nd end of the primary winding group is connected, the 2nd input portion being provided at a position such that the region is interposed between the 2nd input portion, and the 1st output portion and the 2nd output portion.

With this configuration, a distance can be secured between the 1st end and the 2nd end of the primary winding group. Consequently, an end of the primary winding group on the high-voltage side and the other end on the reference potential side can be arranged so as be separated from each other and as a result the effect of noise generated by a high-voltage portion and so forth on the low-voltage portion can be suppressed.

The transformer module may include a rectifying/smoothing circuit that is provided on the substrate and is connected to the 1st output portion and the 2nd output portion, and a load supplying unit that is provided on the substrate and supplies an output voltage/current that has been rectified and smoothed by the rectifying/smoothing circuit to a load circuit, the rectifying/smoothing circuit and the load supplying unit being provided at positions such that the plurality of transformers and the 1st output portion and the 2nd output portion are interposed between the rectifying/smoothing circuit and the load circuit, and the 1st input portion.

With this configuration, a distance can be secured between the 1st input portion, and the rectifying/smoothing circuit and the load supplying unit. Thus, in the case where the 1st input portion is a high-voltage portion and the rectifying/smoothing circuit and the load supplying unit are low-voltage portions, it is possible to arrange the high-voltage portion and the low-voltage portion so as to be separated from each other, and as a result the effect of noise generated by the high-voltage portion and so forth on the low-voltage portions can be suppressed.

A transformer module according to the present invention equipped with a primary winding group in which primary windings of a plurality of transformers are connected in series or parallel with each other and a secondary winding group in which secondary windings of the plurality of transformers are connected in series or parallel with each other, includes a substrate on which the plurality of transformers are arranged and mounted in one direction, a 3rd input portion and a 4th input portion that are provided on the substrate and to which a 1st end and a 2nd end of the primary winding group are connected, and a 3rd output portion that is provided on the substrate and to which a 1st end of the secondary winding group is connected, the 3rd input portion and the 4th input portion, and the 3rd output portion being provided at positions such that the plurality of transformers are interposed between the 3rd input portion and the 4th input portion, and the 3rd output portion.

With this configuration, the distance between the 1st end of the primary winding group and the secondary winding group of the transformer module can be secured as at least the size of a region in which the plurality of transformers are mounted. Thus, in the case where the primary side of the transformer module is a high-voltage portion and the secondary side is a low-voltage portion, it is possible to arrange the high-voltage portion and the low-voltage portion so as to be separated from each other, and as a result the effect of noise generated by the high-voltage portion and so forth on the low-voltage portion can be suppressed.

Furthermore, by forming the primary winding group and the secondary winding group of the transformer module by connecting the primary windings and the secondary windings of the transformers in series or parallel with each other, the transformer capacity of the transformer module can be adjusted. Accordingly, even if small (low profile) transformers are used, a situation in which the transformer module has an insufficient transformer capacity can be avoided and size reduction (profile reduction) can be realized for the transformer module.

The transformer module may further include a 4th output portion that is provided on the substrate and to which a 2nd end of the secondary winding group is connected, the 4th output portion being provided at a position such that the plurality of transformers are interposed between the 4th output portion and the 3rd input portion.

With this configuration, a distance can be secured between the 1st end and the 2nd end of the secondary winding group. Consequently, an end of the secondary winding group on the high-voltage side and the other end on the reference potential side can be arranged so as be separated from each other and as a result the effect of noise generated by a high-voltage portion and so forth on the low-voltage portion can be suppressed.

The transformer module may further include a 4th output portion that is provided on the substrate and to which a 2nd end of the secondary winding group is connected, the 4th output portion being provided at a position such that the plurality of transformers are interposed between the 4th output portion, and the 3rd input portion and the 4th input portion.

With this configuration, the two ends of the secondary winding group can be arranged close to each other and therefore mounting of the output terminals of the transformer module is easier.

The plurality of transformers may be mounted so that winding axis directions of the transformers are aligned with the one direction.

With this configuration, in the case where the primary windings and the secondary windings of the plurality of transformers are connected in series with each other, the wiring pattern can be prevented from becoming complex.

The plurality of transformers may be mounted so that winding axis directions of the transformers are orthogonal to the one direction.

With this configuration, in the case where the primary windings and the secondary windings of the plurality of transformers are connected in parallel with each other, the wiring pattern can be prevented from becoming complex.

The plurality of transformers may include a transformer in which polarities of terminals of the secondary winding are the same as those of terminals of the primary winding and a transformer in which polarities of terminals of the secondary winding are opposite to those of terminals of the primary winding.

With this configuration, the wiring pattern can be prevented from becoming complex.

According to the present invention, a distance can be secured between a high-voltage portion and a low-voltage portion and as a result the effect of the high-voltage portion on the low-voltage portion can be reduced.

DETAILED DESCRIPTION OF THE EXEMPLARY EMBODIMENTS

In the embodiments described below, an example in which a transformer module according to the present invention is used in a wireless power transmission system is illustrated. In the wireless power transmission system, power is wirelessly transmitted from a power transmission device to a power reception device by mounting the power reception device on the power transmission device.

Embodiment 1

Figure 1:
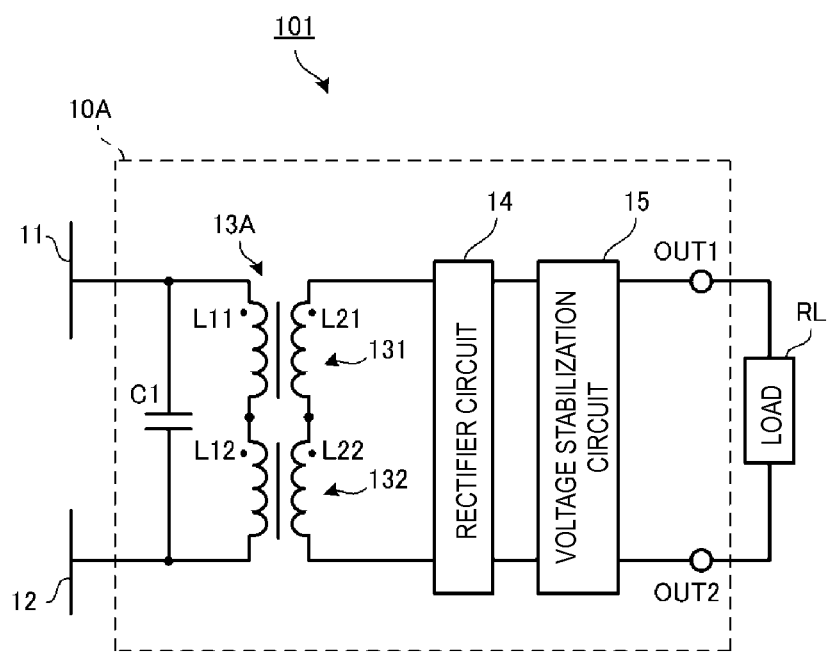
FIG. 1 is a circuit diagram of a power reception device according to embodiment 1.

FIG. 1 illustrates a circuit diagram of a power reception device 101 according to embodiment 1. The power reception device 101 includes a load RL. The load RL is a secondary battery and the power reception device 101 is for example a mobile electronic appliance equipped with the secondary battery. Examples of such a mobile electronic appliance include cellular phone devices, PDAs, portable music players, laptop PCs, digital cameras and so forth. The power reception device 101 charges the secondary battery with power transmitted from a power transmission device.

The power reception device 101 includes an active electrode (1st electrode of present invention) 11 and a passive electrode (2nd electrode of present invention) 12. When the power reception device 101 is mounted on a power transmission device, the active electrode 11 and the passive electrode 12 face an active electrode and a passive electrode of the power transmission device with gaps therebetween. A high voltage (for example, AC 1000 V) is applied to the active electrode and the passive electrode of the power transmission device. As a result of the active electrode 11 facing the active electrode of the power transmission device, an electric field is generated between the electrodes. Power is transmitted from the power transmission device to the power reception device 101 via the electric field.

The active electrode 11 and the passive electrode 12 are connected to a circuit module 10A. The circuit module 10A corresponds to a transformer module of the present invention. The circuit module 10A includes a step-down transformer 13A, a rectifier circuit 14 and a voltage stabilization circuit 15, and steps down and then rectifies and smoothes a voltage induced in the active electrode 11 and the passive electrode 12.

The step-down transformer 13A includes two transformer elements 131 and 132. A primary coil (primary winding group of present invention) of the step-down transformer 13A is formed by connecting primary coils L11 and L12 of the transformer elements 131 and 132 in series with each other. A secondary coil (secondary winding group of present invention) of the step-down transformer 13A is formed by connecting secondary coils L21 and L22 of the transformer elements 131 and 132 in series with each other. The primary coil of the step-down transformer 13A is connected to the active electrode 11 and the passive electrode 12 and the secondary coil of the step-down transformer 13A is connected to the rectifier circuit 14.

In addition, a capacitor C1 is connected to the primary coil of the step-down transformer 13A. The capacitor C1 forms a parallel resonance circuit together with the primary coil and a leakage inductance (not illustrated) of the step-down transformer 13A.

The rectifier circuit 14 includes a diode bridge and the voltage stabilization circuit 15 includes a DC-DC converter. The voltage stabilization circuit 15 is connected to output terminals OUT1 and OUT2. The load RL is connected to the output terminals OUT1 and OUT2. An alternating-current voltage induced in the active electrode 11 and the passive electrode 12 is stepped down by the step-down transformer 13A, the voltage is then rectified and smoothed by the rectifier circuit 14 and the voltage stabilization circuit 15, and the voltage is then applied to the load RL.

Figure 2:
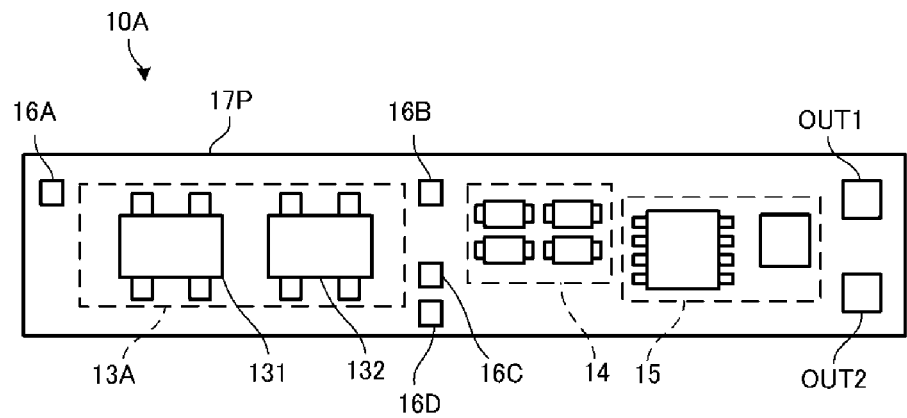
FIG. 2 is a plan view of a circuit module.

FIG. 2 is a plan view of the circuit module 10A. In FIG. 2, illustration of the capacitor C1 illustrated in FIG. 1 is omitted.

The circuit module 10A includes a rectangular printed substrate 17P. A connection terminal (1st input portion of present invention) 16A is provided at an end (left side in figure) of the printed substrate 17P in a lengthwise direction of the printed substrate 17P. The connection terminal 16A is a terminal that connects one end of the primary winding of the step-down transformer 13A and the active electrode 11. In addition, the output terminals OUT1 and OUT2 are provided at the other end (right side in figure) of the printed substrate 17P in the lengthwise direction of the printed substrate 17P. That is, the connection terminal 16A and the output terminals OUT1 and OUT2 are provided at positions on the printed substrate 17P that are maximally separated from each other.

The step-down transformer 13A, the rectifier circuit 14 and the voltage stabilization circuit 15 are mounted along the lengthwise direction of the printed substrate 17P between the connection terminal 16A and the output terminals OUT1 and OUT2. In addition, the transformer elements 131 and 132 of the step-down transformer 13A are mounted along the lengthwise direction. Connection terminals 16B, 16C and 16D are provided on the opposite side of the step-down transformer 13A to the connection terminal 16A in the lengthwise direction. The connection terminal (2nd input portion of present invention) 16B is a terminal that connects one end of the primary winding of the step-down transformer 13A and the passive electrode 12. The connection terminals (1st output portion and 2nd output portion of present invention) 16C and 16D are terminals that connect the secondary winding of the step-down transformer 13A and the rectifier circuit 14.

As described above, a high voltage (for example, AC 1000 V) is applied to the active electrode and the passive electrode of the power transmission device. The circuit module 10A steps down a voltage induced in the active electrode 11 and the passive electrode 12 and applies the stepped-down voltage to the load RL. That is, in the circuit module 10A, the connection terminal 16A is a high-voltage portion and the connection terminals 16B, 16C and 16D, the rectifier circuit 14, the voltage stabilization circuit 15 and the output terminals OUT1 and OUT2 are low-voltage portions. Therefore, the high-voltage portion and the low-voltage portions of the printed substrate 17P are arranged with the step-down transformer 13A interposed therebetween.

Thus, a distance is secured between the high-voltage portion and the low-voltage portions in the circuit module 10A and as a result the effect of noise generated by the high-voltage portion and so forth on the low-voltage portions can be reduced. Furthermore, by arranging the two transformer elements 131 and 132 of the step-down transformer 13A along the lengthwise direction, a larger distance can be realized between the high-voltage portion and the low-voltage portions and the effect of noise generated by the high-voltage portion and so forth on the low-voltage portions can be more effectively reduced.

Figure 3:
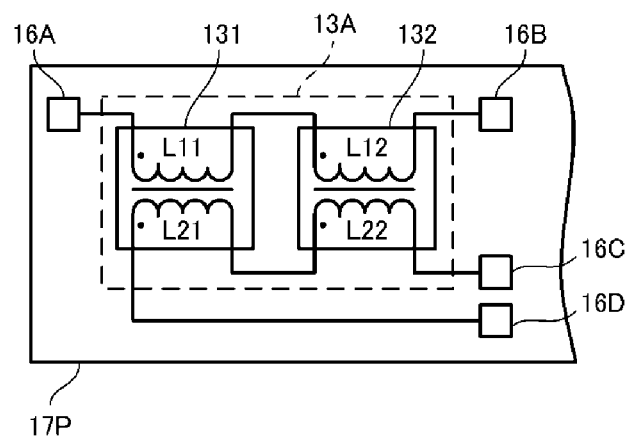
FIG. 3 illustrates a wiring pattern of a step-down transformer.

FIG. 3 illustrates a wiring pattern of the step-down transformer 13A. The transformer elements 131 and 132 are mounted so that winding axes thereof are aligned with the lengthwise direction of the printed substrate 17P. One end of the primary coil L11 of the transformer element 131 is connected to the connection terminal 16A and the other end of the primary coil L11 of the transformer element 131 is connected to one end of the primary coil L12 of the transformer element 132. The other end of the primary coil L12 of the transformer element 132 is connected to the connection terminal 16B.

One end of the secondary coil L21 of the transformer element 131 is connected to the connection terminal 16D and the other end of the secondary coil L21 of the transformer element 131 is connected to one end of the secondary coil L22 of the transformer element 132. The other end of the secondary coil L22 of the transformer element 132 is connected to the connection terminal 16C.

As described above, there is a demand for each component of the power reception device 101, which is a mobile electronic appliance, to be reduced in size and thickness. Accordingly, it is desirable that the step-down transformer 13A also have a low profile, but there is a problem in that if the step-down transformer 13A is a single element and the profile thereof is to be reduced, the transformer capacity will become insufficient and a sufficient output voltage will not be obtained. In this embodiment, the step-down transformer 13A is formed of the two transformer elements 131 and 132, and therefore even if the profiles of the transformer elements 131 and 132 are reduced, it is possible to avoid an insufficient transformer capacity by connecting these elements together. In addition, it is possible to reduce the overall profile of the step-down transformer 13A by reducing the profiles of its constituent elements.

In addition, as illustrated in FIG. 3, by arranging the transformer elements 131 and 132 so that the winding axes thereof are aligned with the lengthwise direction of the printed substrate 17P, even if the wiring patterns of the serially connected primary coils L11 and L12 and the wiring patterns of the serially connected secondary coils L21 and L22 are formed on the same surface (mounting surface) of the printed substrate 17P, the wiring patterns can be formed without intersecting each other and therefore the wiring patterns do not become complicated.

Figure 4:
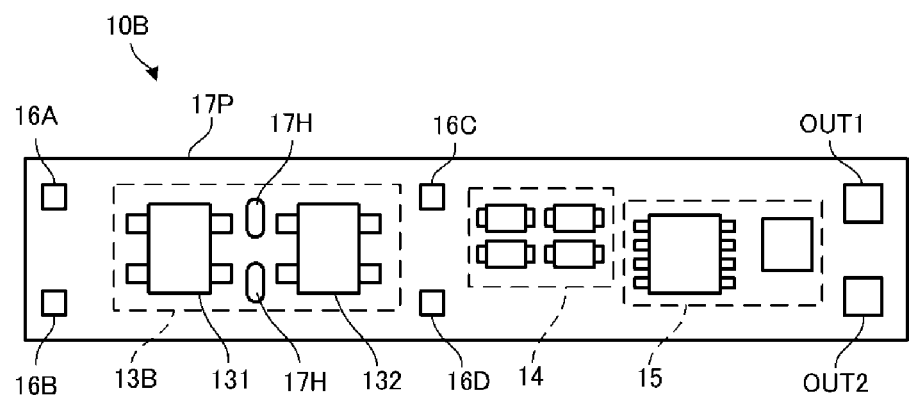
FIG. 4 is a plan view of another example circuit module.
Figure 5:
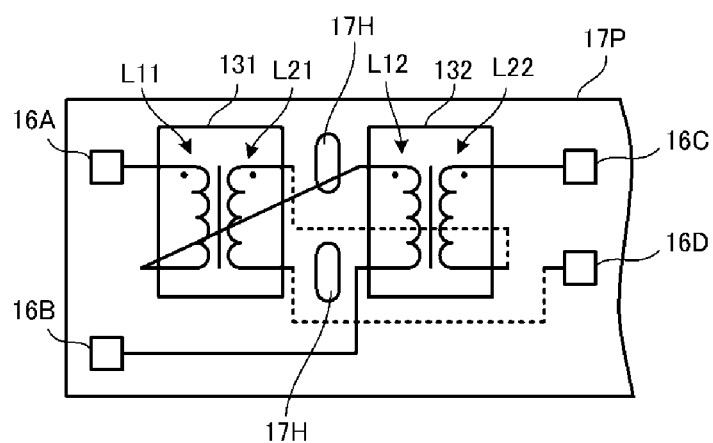
FIG. 5 illustrates a wiring pattern of a step-down transformer included in the other example circuit module.

It is sufficient that the circuit module have a configuration in which the distance between a high-voltage portion and a low-voltage portion, in particular, the distance between the connection terminal 16A on the primary high-potential side of the step-down transformer 13A and the secondary-side connection terminals 16C and 16D can be secured and the circuit module is not limited to the above-described configuration. FIG. 4 is a plan view of another example circuit module 10B. FIG. 5 illustrates a wiring pattern of a step-down transformer 13B included in the other example circuit module 10B. The broken line illustrated in FIG. 5 indicates a wiring pattern that connects the secondary coils L12 and L22 of the transformer elements 131 and 132 and is formed on a back surface of the printed substrate 17P. The mounting surface of the printed substrate 17P is the front surface.

In this example, the primary-side reference-potential-side connection terminal 16B is provided at an end portion of the printed substrate 17P where the connection terminal 16A is provided. In addition, the transformer elements 131 and 132 of the step-down transformer 13B are mounted such that the winding axes thereof are aligned with a widthwise direction of the printed substrate 17P. Furthermore, elliptical holes 17H for preventing the effect of a potential difference between the secondary coil L21 of the transformer element 131 and the primary coil L12 of the transformer element 132 are formed between the transformer elements 131 and 132 on the printed substrate 17P.

By providing the connection terminals 16A and 16B on the same end portion of the printed substrate 17P, it is possible to gather the input terminals of the circuit module 10A together.

Next, description will be given of a power transmission device that forms a pair with the power reception device 101 and transmits power to the power reception device 101.

Figure 6:
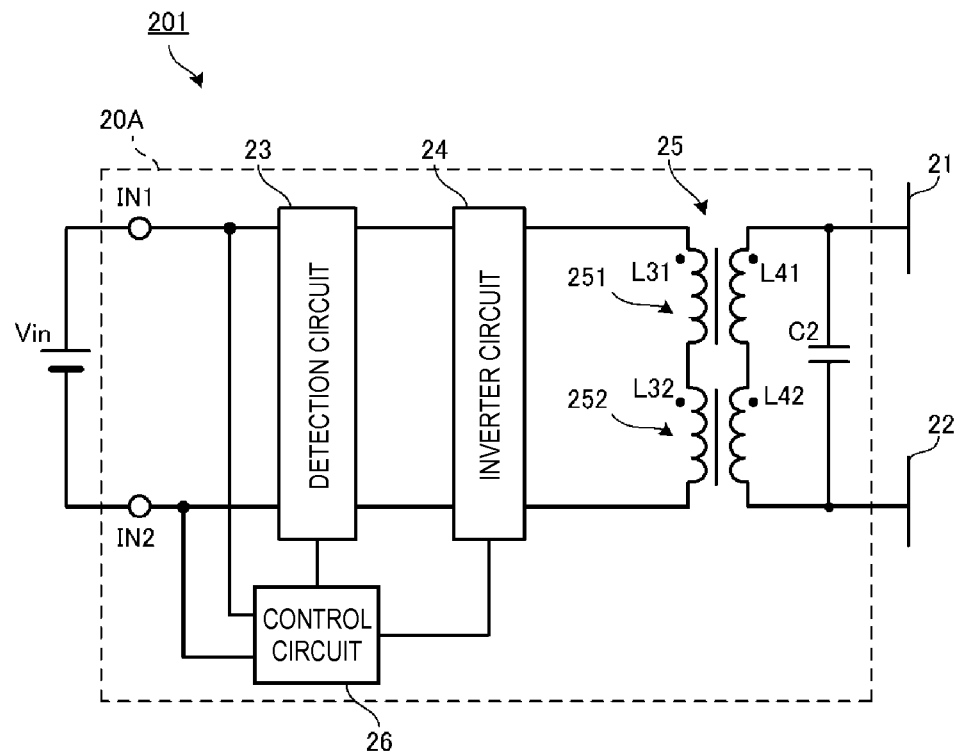
FIG. 6 is a circuit diagram of a power transmission device according to embodiment 1.

FIG. 6 illustrates a circuit diagram of a power transmission device 201 according to embodiment 1. The power transmission device 201 includes an active electrode (3rd electrode of present invention) 21 and a passive electrode (4th electrode of present invention) 22. The active electrode 21 and the passive electrode 22 face the active electrode 11 and the passive electrode 12 of the power reception device 101 with gaps therebetween.

The active electrode 21 and the passive electrode 22 are connected to a circuit module 20A. The circuit module 20A corresponds to a transformer module of the present invention. The circuit module 20A includes a detection circuit 23, an inverter circuit 24, a step-up transformer 25 and a control circuit 26, and the circuit module 20A converts a voltage (DC 5 V or DC 12 V) from a direct-current power supply Vin connected to input terminals IN1 and IN2 into an alternating-current voltage, steps up the alternating-current voltage and then applies the stepped-up alternating-current voltage to the active electrode 21 and the passive electrode 22.

The detection circuit 23 detects an input voltage and an input current from the direct-current power supply Vin. The inverter circuit 24 includes a plurality of switching elements and converts a direct-current voltage into an alternating-current voltage. The control circuit 26 acquires information of a voltage detected by the detection circuit 23 and of an output voltage from the output terminals OUT1 and OUT2 detected on the power reception device 101 side and subjects the inverter circuit 24 to feedback control in accordance with these pieces of information.

The step-up transformer 25 includes transformer elements 251 and 252. A primary coil (primary winding group of present invention) of the step-up transformer 25 is formed by connecting primary coils L31 and L32 of the transformer elements 251 and 252 in series with each other. A secondary coil (secondary winding group of present invention) of the step-up transformer 25 is formed by connecting secondary coils L41 and L42 of the transformer elements 251 and 252 in series with each other. The primary coil of the step-up transformer 25 is connected to the inverter circuit 24 and the secondary coil of the step-up transformer 25 is connected to the active electrode 21 and the passive electrode 22.

A capacitor C2 is connected to the secondary coil of the step-up transformer 25. The capacitor C2 forms a series resonance circuit together with the secondary coil and a leakage inductance (not illustrated) of the step-up transformer 25.

Figure 7:
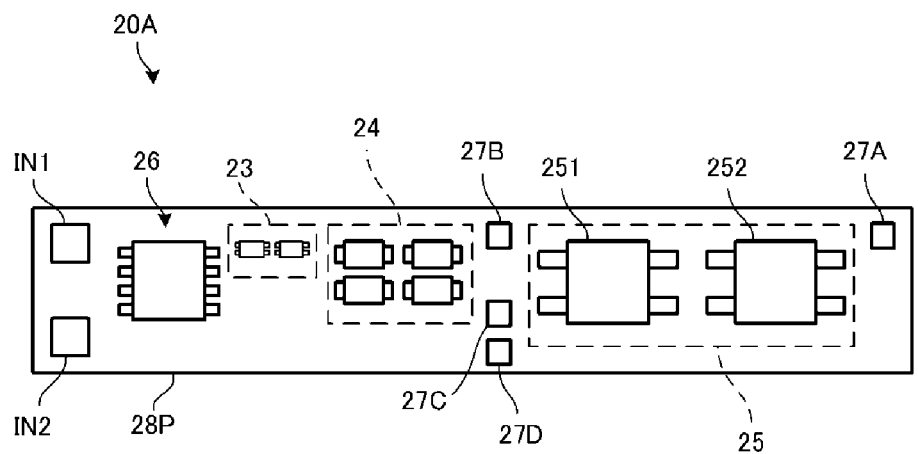
FIG. 7 is a plan view of a circuit module.

FIG. 7 is a plan view of the circuit module 20A. In FIG. 7, illustration of the capacitor C2 illustrated in FIG. 6 is omitted.

The circuit module 20A includes a rectangular printed substrate 28P. The input terminals IN1 and IN2 are provided at one end (left side in figure) of the printed substrate 28P in a lengthwise direction of the printed substrate 28P. In addition, a connection terminal (3rd output portion of present invention) 27A, which connects the secondary coil of the step-up transformer 25 and the active electrode 21, is provided at the other end (right side in figure) of the printed substrate 28P in the lengthwise direction of the printed substrate 28P. That is, the input terminals IN1 and IN2 and the connection terminal 27A are provided at positions on the printed substrate 28P that are maximally separated from each other.

The control circuit 26, the detection circuit 23, the inverter circuit 24 and the step-up transformer 25 are mounted along the lengthwise direction between the input terminals IN1 and IN2 and the connection terminal 27A. In addition, the transformer elements 251 and 252 of the step-up transformer 25 are mounted along the lengthwise direction. Connection terminals 27B, 27C and 27D are provided on the opposite side of the step-up transformer 25 to the connection terminal 27A in the lengthwise direction. The connection terminal (4th output portion of the present invention) 27B is a terminal that connects one end of the secondary coil of the step-up transformer 25 and the passive electrode 22. The connection terminals (3rd input portion and 4th input portion of present invention) 27C and 27D are terminals that connect the primary coil of the step-up transformer 25 and the inverter circuit 24.

The circuit module 20A steps up a voltage (DC 5 V or DC 12 V) input from the input terminals IN1 and IN2 to a high voltage (AC 1000 V) using the step-up transformer 25 and applies the stepped-up voltage to the active electrode 21 and the passive electrode 22. That is, in the circuit module 20A, the input terminals IN1 and IN2, the control circuit 26, the detection circuit 23, the inverter circuit 24 and the connection terminals 27B, 27C and 27D are low-voltage portions and the connection terminal 27A serving as an output portion of the step-up transformer 25 is a high-voltage portion. Therefore, the high-voltage portion and the low-voltage portions of the printed substrate 28P are arranged with the step-up transformer 25 interposed therebetween.

Thus, a distance is secured between the high-voltage portion and the low-voltage portions in the circuit module 20A and as a result the effect of noise generated by the high-voltage portion and so forth on the low-voltage portions can be reduced. Furthermore, by arranging the two transformer elements 251 and 252 of the step-up transformer 25 along the lengthwise direction, a larger distance can be realized between the high-voltage portion and the low-voltage portions and the effect of noise generated by the high-voltage portion and so forth on the low-voltage portions can be reduced.

Figure 8:
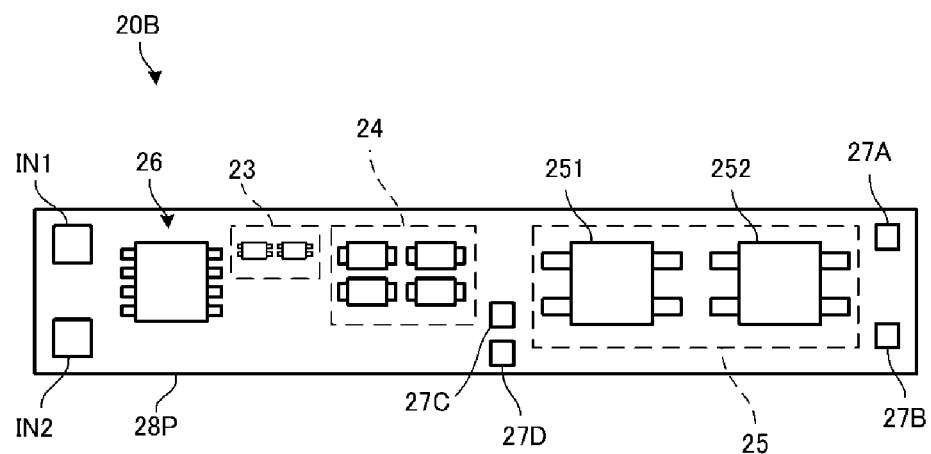
FIG. 8 is a plan view of another example circuit module.

FIG. 8 is a plan view of another example circuit module 20B. In this example, similarly to as in the power reception device 101 illustrated in FIG. 4, the connection terminal 27B, which is on the reference-potential-side of the secondary-side of the step-up transformer 25, is provided on the same end portion of the printed substrate 28P as the connection terminal 27A. By providing the connection terminals 27A and 27B on the same end portion of the printed substrate 28P, it is possible to gather the output terminals of the circuit module 20B together.

The wiring patterns of the step-up transformer 25 of the circuit modules 20A and 20B illustrated in FIG. 7 and FIG. 8 are the same as those of the circuit modules 10A and 10B of the power reception device 101 and therefore description thereof is omitted.

Embodiment 2

Hereafter, embodiment 2 of the present invention will be described. In this embodiment, the configuration of the step-down transformer of the circuit module of the power reception device is different to that in embodiment 1. Specifically, the step-down transformer 13A according to embodiment 1 has two transformer elements 131 and 132, whereas a step-down transformer according to this embodiment has four transformer elements. In a primary coil and a secondary coil of the step-down transformer according to this embodiment, the respective primary coils and secondary coils of the four transformer elements may be connected in series with each other or may be connected in parallel with each other.

Hereafter, description will be given for each of a case in which the secondary coils of the step-down transformer are connected in parallel with each other, a case in which the primary coils and the secondary coils are each connected in parallel with each other, and a case in which the primary coils are connected in parallel with each other. The primary side is a low-voltage portion and the secondary side is a high-voltage portion in the step-up transformer of the power transmission device, and since the description of the step-up transformer would be similar to the description of the step-down transformer of the power reception device in which the primary side is a high-voltage portion and the secondary side is a low-voltage portion, description of the power transmission device is omitted in this embodiment.

Figure 9:
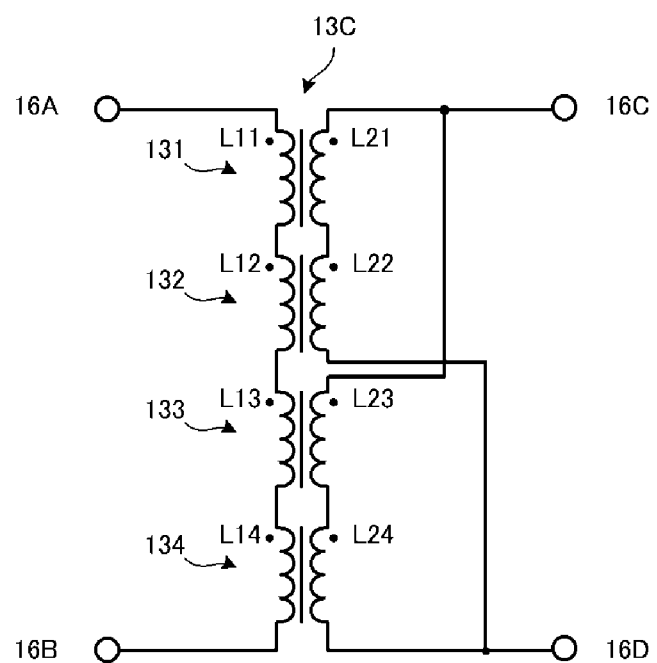
FIG. 9 is a circuit diagram of a step-down transformer in which the primary coils are connected in series with each other and the secondary coils are connected in parallel with each other.

FIG. 9 is a circuit diagram of a step-down transformer 13C in which the primary coils are connected in series with each other and the secondary coils are connected in parallel with each other.

The step-down transformer 13C has four transformer elements 131, 132, 133 and 134. The primary coil of the step-down transformer 13C is formed by connecting primary coils L11, L12, L13 and L14 of the transformer elements 131, 132, 133 and 134 in series with each other. The secondary coil of the step-down transformer 13C is formed by connecting serially connected secondary coils L21 and L22 of the transformer elements 131 and 132 and serially connected secondary coils L23 and L24 of the transformer elements 133 and 134 in parallel with each other.

Thus, as a result of connecting the primary coils of the step-down transformer 13C in series with each other, for example, in the case where AC 1000 V is applied to the primary side, AC 250 V is applied to each of the primary coils L11, L12, L13 and L14. Therefore, hysteresis loss in the transformer elements 131, 132, 133 and 134 can be reduced and efficient power transmission can be realized.

Figure 10:
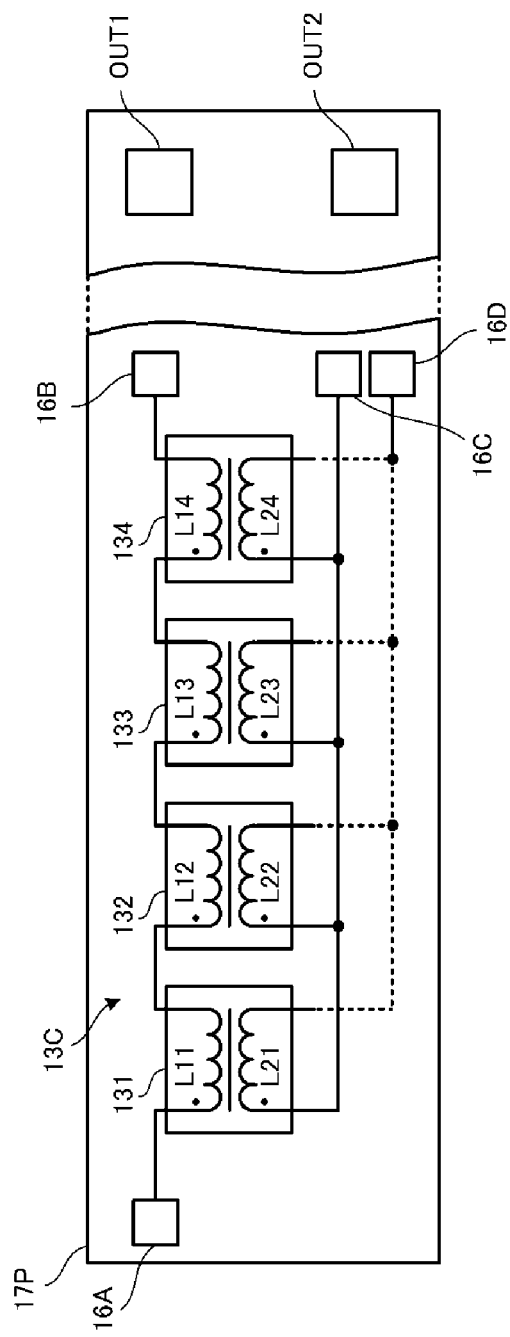
FIG. 10 illustrates a wiring pattern of a step-down transformer according to embodiment 2.
Figure 11:
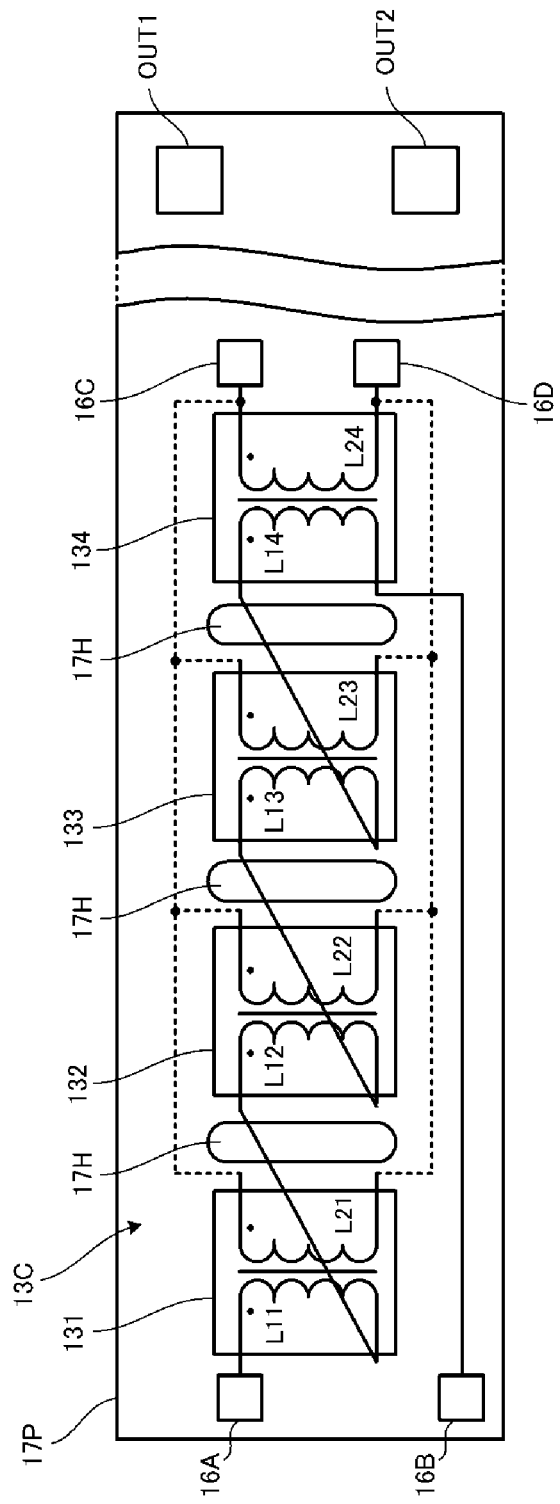
FIG. 11 illustrates a wiring pattern of the step-down transformer according to embodiment 2.

FIG. 10 and FIG. 11 illustrate wiring patterns of the step-down transformer 13C according to embodiment 2. FIG. 10 illustrates a wiring pattern of a configuration in which the transformer elements 131, 132, 133 and 134 are arranged such that their winding axes are aligned with the lengthwise direction of the printed substrate 17P. FIG. 11 illustrates a wiring pattern of a configuration in which the transformer elements 131, 132, 133 and 134 are arranged such that their winding axes are aligned with the widthwise direction of the printed substrate 17P. In the case of a parallel connection configuration, the wiring pattern can be prevented from becoming complicated by arranging the transformer elements 131, 132, 133 and 134 as illustrated in FIG. 11.

Figure 12:
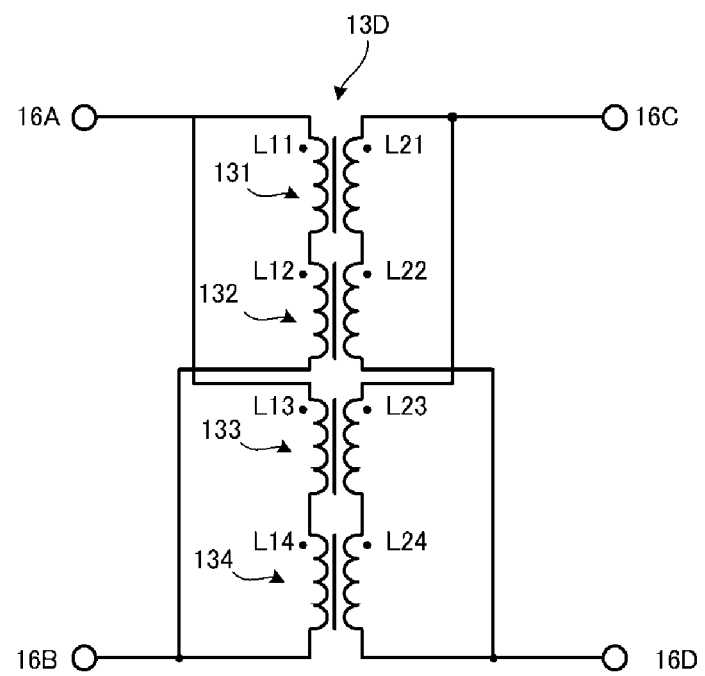
FIG. 12 is a circuit diagram of a step-down transformer in which the primary coils and secondary coils are connected in parallel with each other.

FIG. 12 is a circuit diagram of a step-down transformer 13D in which the primary coils and the secondary coils are connected in parallel with each other.

The step-down transformer 13D has four transformer elements 131, 132, 133 and 134. The primary coil of the step-down transformer 13D is formed by connecting serially connected primary coils L11 and L12 of the transformer elements 131 and 132 and serially connected primary coils L13 and L14 of the transformer elements 133 and 134 in parallel with each other. The secondary coil of the step-down transformer 13D is formed by connecting serially connected secondary coils L21 and L22 of the transformer elements 131 and 132 and serially connected secondary coils L23 and L24 of the transformer elements 133 and 134 in parallel with each other.

Figure 13:
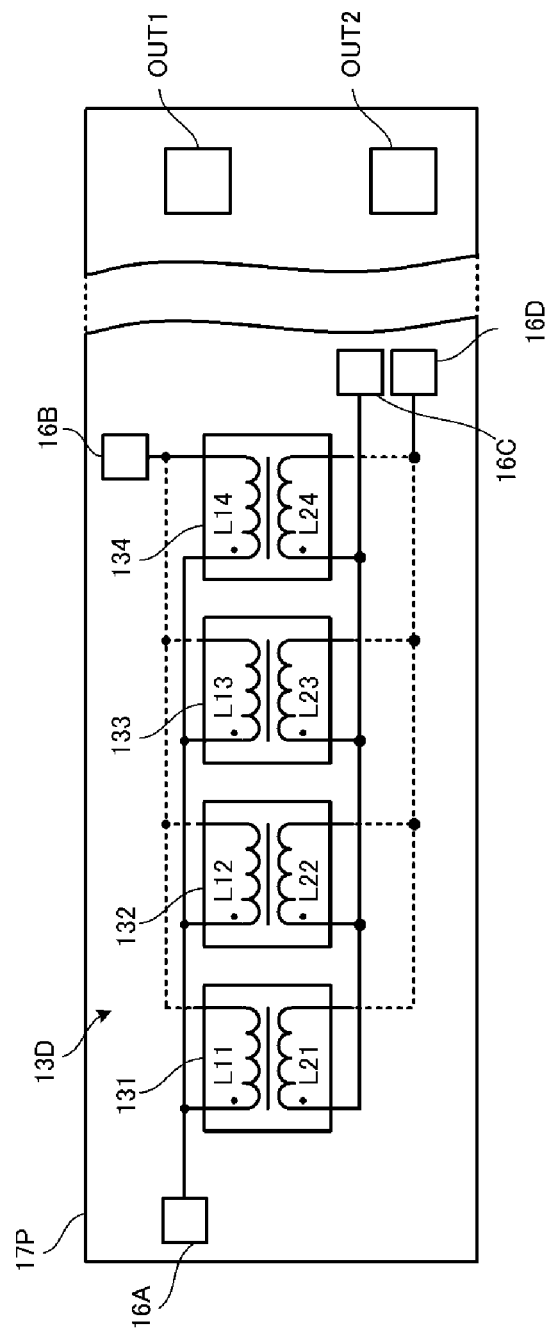
FIG. 13 illustrates a wiring pattern of a step-down transformer according to embodiment 3.
Figure 14:
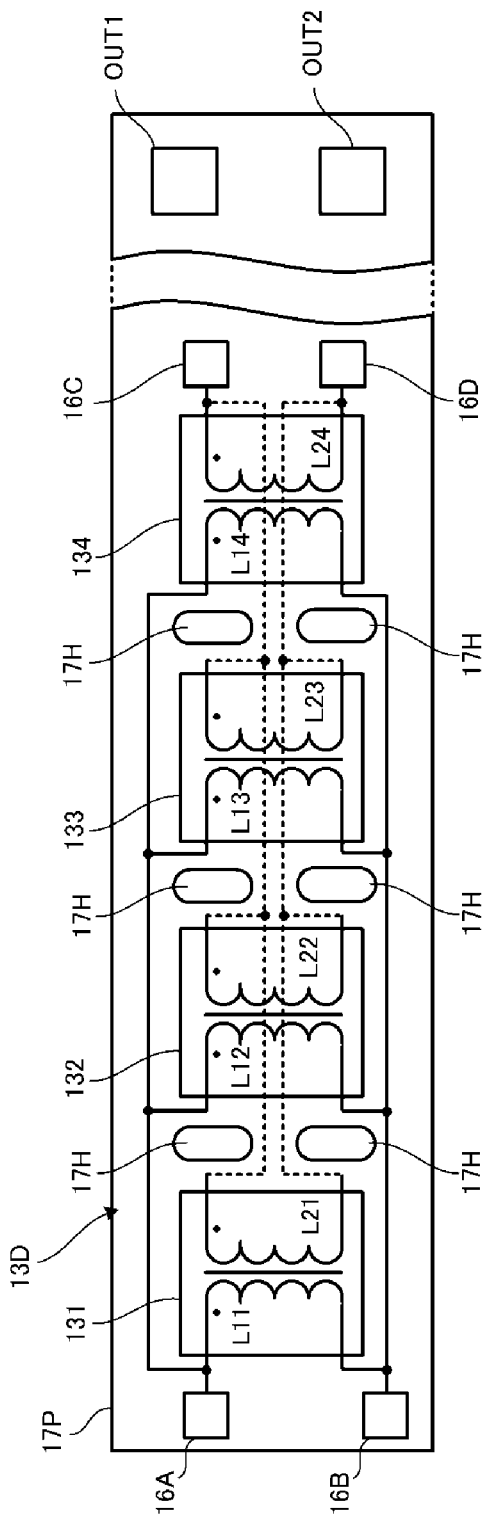
FIG. 14 illustrates a wiring pattern of a step-down transformer according to embodiment 3.

FIG. 13 and FIG. 14 illustrate wiring patterns of the step-down transformer 13D according to embodiment 3. FIG. 13 illustrates a wiring pattern of a configuration in which the transformer elements 131, 132, 133 and 134 are arranged such that their winding axes are aligned with the lengthwise direction of the printed substrate 17P. FIG. 14 illustrates a wiring pattern of a configuration in which the transformer elements 131, 132, 133 and 134 are arranged such that their winding axes are aligned with the widthwise direction of the printed substrate 17P.

Figure 15:
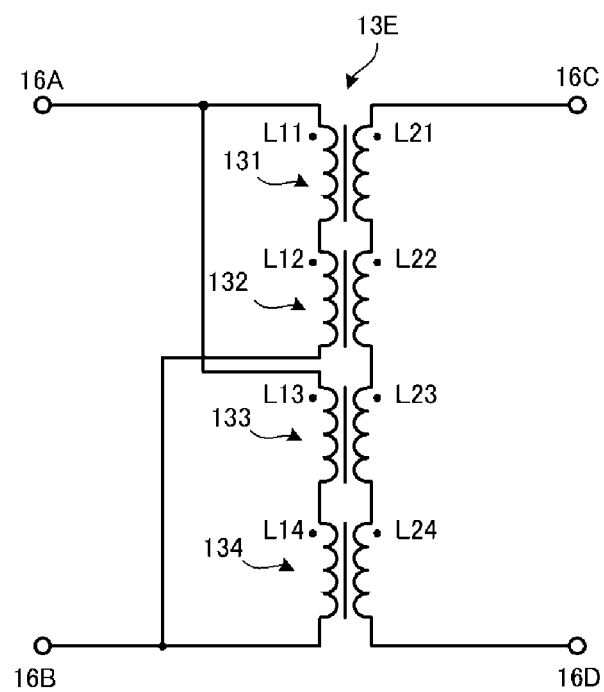
FIG. 15 is a circuit diagram of a step-down transformer in which the primary coils are connected in parallel with each other and the secondary coils are connected in series with each other.

FIG. 15 is a circuit diagram of a step-down transformer 13E in which the primary coils are connected in parallel with each other and the secondary coils are connected in series with each other.

The primary coil of the step-down transformer 13E is formed by connecting serially connected primary coils L11 and L12 of the transformer elements 131 and 132 and serially connected primary coils L13 and L14 of the transformer elements 133 and 134 in parallel with each other. The secondary coil of the step-down transformer 13E is formed by connecting secondary coils L21, L22, L23 and L24 of the transformer elements 131, 132, 133 and 134 in series with each other.

Figure 16:
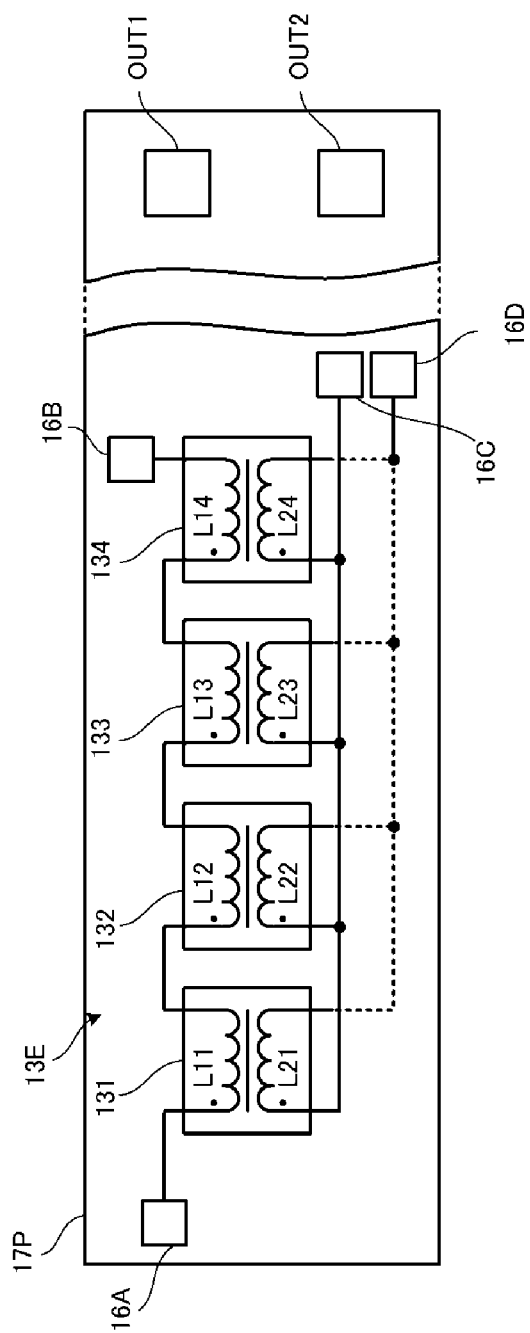
FIG. 16 illustrates a wiring pattern of a step-down transformer according to embodiment 3.
Figure 17:
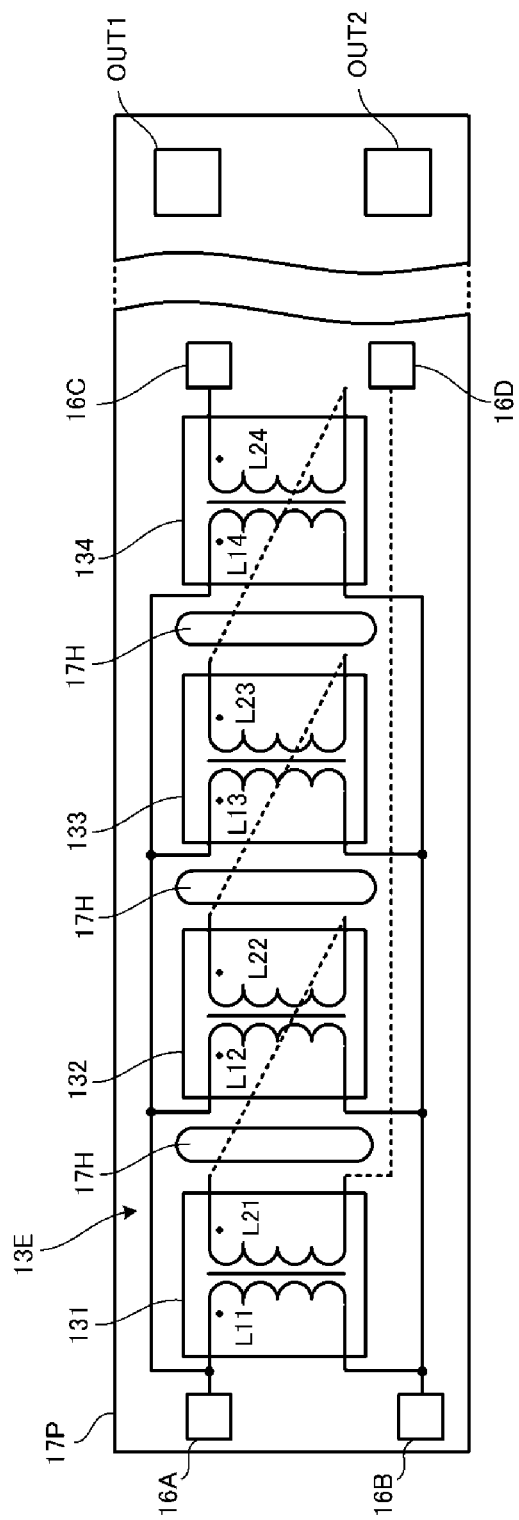
FIG. 17 illustrates a wiring pattern of the step-down transformer according to embodiment 3.

FIG. 16 and FIG. 17 illustrate wiring patterns of the step-down transformer 13E according to embodiment 3. FIG. 16 illustrates a wiring pattern of a configuration in which the transformer elements 131, 132, 133 and 134 are arranged such that their winding axes are aligned with the lengthwise direction of the printed substrate 17P. FIG. 17 illustrates a wiring pattern of a configuration in which the transformer elements 131, 132, 133 and 134 are arranged such that their winding axes are aligned with the widthwise direction of the printed substrate 17P.

As illustrated in FIG. 10, FIG. 11, FIG. 13, FIG. 14, FIG. 16 and FIG. 17, by arranging the four transformer elements 131, 132, 133 and 134 of the step-down transformer 13C in the lengthwise direction of the printed substrate 17P, a larger distance can be secured between a high-voltage portion and a low-voltage portion compared with embodiment 1.

In addition, in the case of the configurations illustrated in FIG. 10, FIG. 13 and FIG. 16, the effect of a high-voltage portion on a low-voltage portion can be reduced by securing the distance between the connection terminal 16A, which is a high-voltage portion, and the connection terminal 16B, which is a low-voltage portion. In the case of the configurations illustrated in FIG. 11, FIG. 14 and FIG. 17, by providing the connection terminals 16A and 16B on the same end portion of the printed substrate 17P, the input terminals of the circuit module can be gathered together.

The mounting direction of the transformer elements 131, 132, 133 and 134 need not be such a direction that the winding axis directions of the elements are aligned with the lengthwise direction or the widthwise direction of the printed substrate 17P. Furthermore, the step-down transformer may have a configuration in which transformer elements arranged so that their winding axis directions are aligned with the lengthwise direction of the printed substrate 17P and transformer elements arranged so that their winding axis directions are aligned with the widthwise direction are both used.

Hereafter, a modification of embodiment 2 will be described. In embodiment 2, a configuration is described in which the transformer elements 131, 132, 133 and 134 of the step-down transformer are arranged in a single row (in lengthwise direction of printed substrate 17P), but the four transformer elements 131, 132, 133 and 134 of the step-down transformer may be instead arranged in a matrix.

Figure 18:
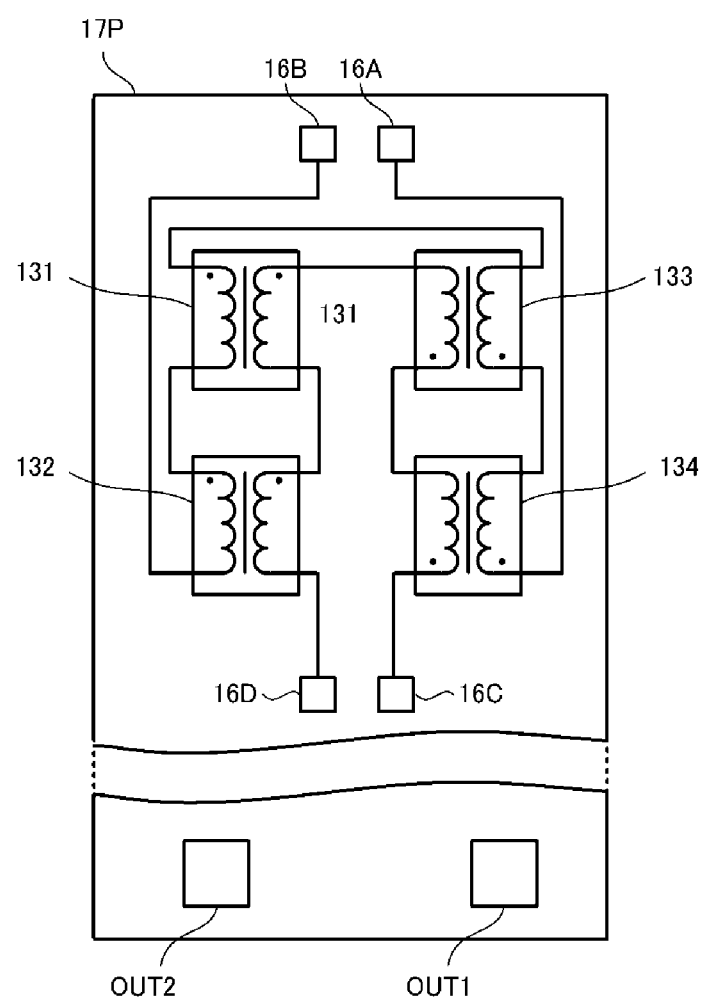
FIG. 18 illustrates a wiring pattern for a configuration in which four transformer elements are arranged in two rows and two columns.
Figure 19:
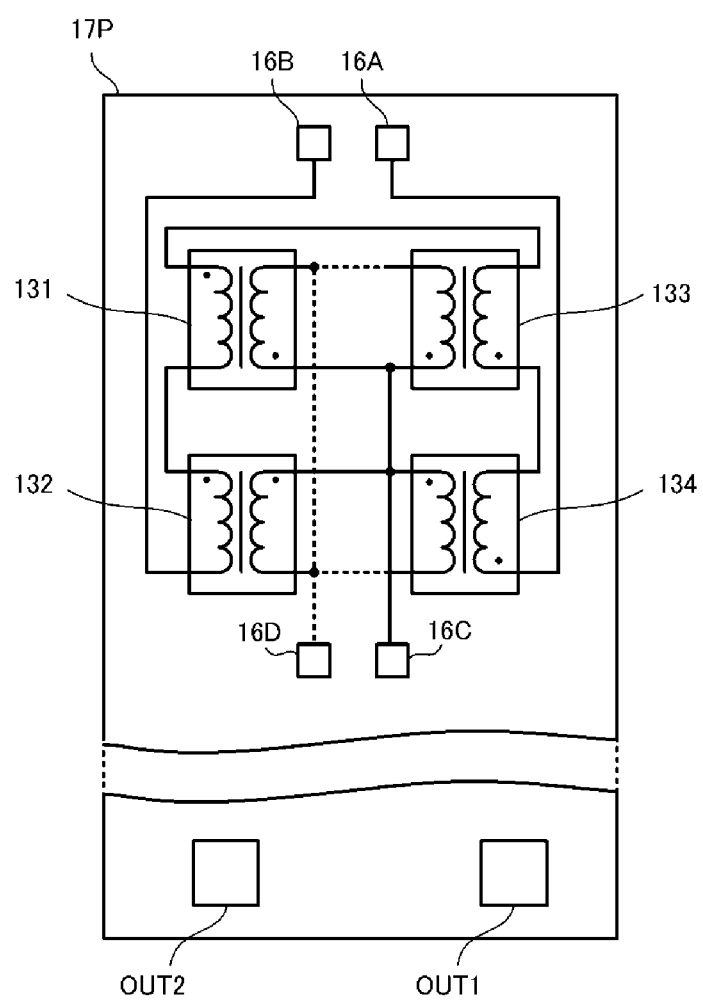
FIG. 19 illustrates a wiring pattern for a configuration in which four transformer elements are arranged in two rows and two columns.
Figure 20:
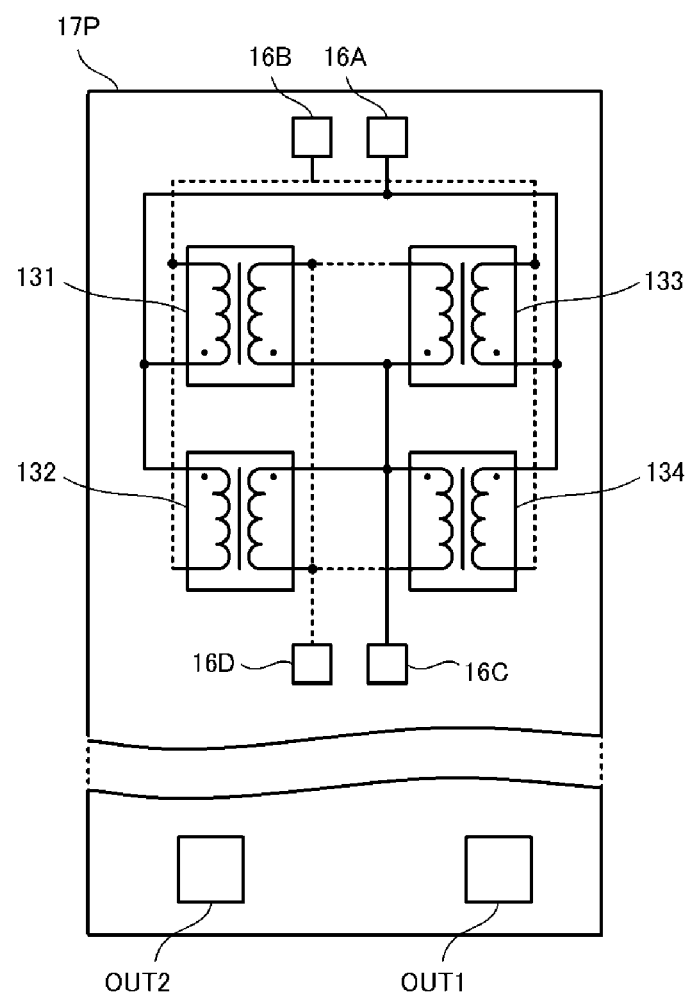
FIG. 20 illustrates a wiring pattern for a configuration in which four transformer elements are arranged in two rows and two columns.
Figure 21:
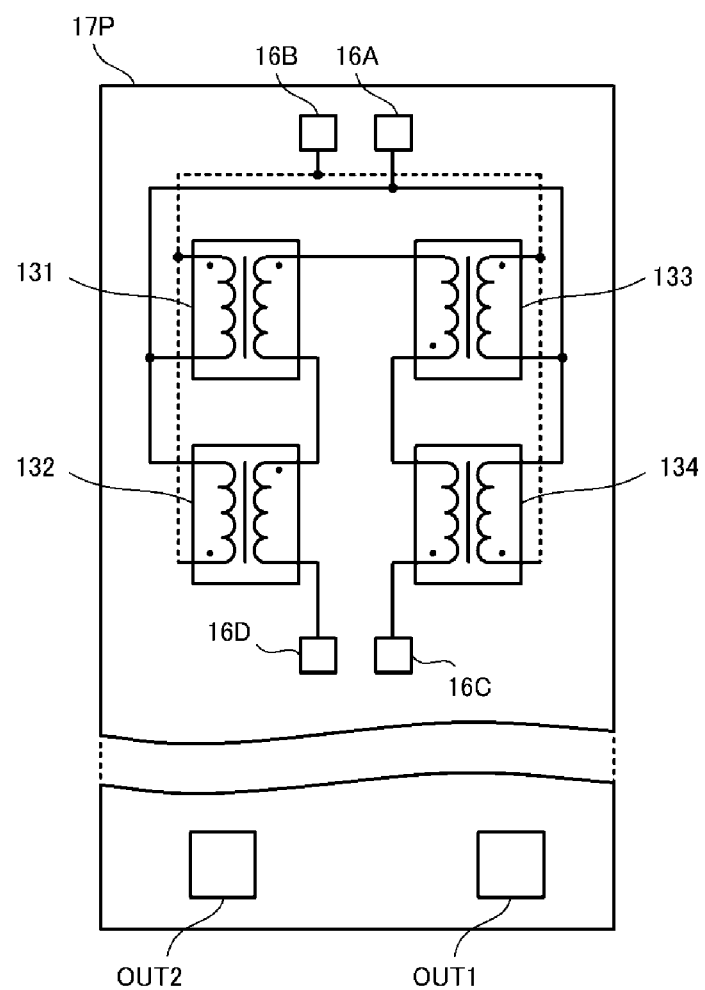
FIG. 21 illustrates a wiring pattern for a configuration in which four transformer elements are arranged in two rows and two columns.

FIG. 18, FIG. 19, FIG. 20 and FIG. 21 illustrate wiring patterns for a configuration in which the four transformer elements 131, 132, 133 and 134 are arranged in two rows and two columns. FIG. 18 illustrates a wiring pattern of a step-down transformer in which the primary coils and the secondary coils are connected in series with each other. FIG. 19 illustrates a wiring pattern of a step-down transformer in which the primary coils are connected in series with each other and the secondary coils are connected in parallel with each other. FIG. 20 illustrates a wiring pattern of a step-down transformer in which the primary coils and the secondary coils are connected in parallel with each other. FIG. 21 illustrates a wiring pattern of a step-down transformer in which the primary coils are connected in parallel with each other and the secondary coils are connected in series with each other.

As illustrated in FIGS. 18 to 21, a region in which the transformer elements 131, 132, 133 and 134 are mounted is interposed between the connection terminals 16A and 16B and the connection terminals 16C and 16D. Consequently, it is possible to make the distance between the connection terminals 16A and 16B, which are high-voltage portions, and the connection terminals 16C and 16D, which are low-voltage portions, on the printed substrate 17P larger.

In addition, in the case where the four transformer elements 131, 132, 133 and 134 are arranged in two rows and two columns, for example, the mounting direction or the polarities of the terminals of the secondary coils with respect to the terminals of the primary coils of the transformer elements 131, 132, 133 and 134 are appropriately changed. For example, in FIG. 18, the transformer elements 131 and 132 and the transformer elements 133 and 134 are mounted such that the orientations of the elements are 180° opposite to each other. In addition, in FIG. 21, the polarities of the terminals of the secondary coils of the transformer elements 132 and 133 are opposite to those of the terminals of the primary coils. As a result, it can be ensured that the wiring patterns of the step-down transformer formed on the same surface of the printed substrate 17P do not cross each other and the complexity of the wiring patterns can be reduced.

The step-down transformer is not limited to being one in which the transformer elements are arranged in a two rows and two columns. For example, in the case where the step-down transformer has six transformer elements, the transformer elements may be arranged in a two rows and three columns or three rows and two columns. In this case, the connection terminals that are high-voltage portions and the connection terminals that are low-voltage portions are mounted at positions that are maximally separated from each other in the mounting region of the transformer elements arranged in a matrix. In this way, a distance can be secured between the high-voltage portions and the low-voltage portions and the effect of the high-voltage portions on the low-voltage portions can be reduced. In addition, a step-down transformer has been described above as an example for transformer elements arranged in two rows and two columns, two rows and three columns, three rows and two columns and so forth, but the same can be also applied to step-up transformers.

REFERENCE SIGNS LIST 10A, 10B—circuit module (transformer module)
11—active electrode (1st electrode)
12—passive electrode (2nd electrode)
13A, 13B, 13C, 13D, 13E—step-down transformer
14—rectifier circuit
15—voltage stabilization circuit
16A—connection terminal (1st input portion)
16B—connection terminal (2nd input portion)
16C—connection terminal (1st output portion)
16D—connection terminal (2nd output portion)
17P—printed substrate
17H—hole
20A, 20B—circuit module (transformer module)
21—active electrode (3rd electrode)
22—passive electrode (4th electrode)
23—detection circuit
24—inverter circuit
25—step-up transformer
27A—connection terminal (3rd output portion)
27B—connection terminal (4th output portion)
27C—connection terminal (3rd input portion)
27D—connection terminal (4th input portion)
28P—printed substrate
101—power reception device
201—power transmission device
131, 132, 133, 134—transformer element
251, 252—transformer element
IN1, IN2—input terminal
OUT1, OUT2—output terminal

The invention claimed is:
1. A transformer module comprising:
a substrate;
a primary winding group mounted on the substrate and forming primary windings of a plurality of transformers coupled that are in series or parallel with each other;
a secondary winding group mounted on the substrate and forming secondary windings of the plurality of transformers that are coupled in series or parallel with each other;
a first input terminal disposed on the substrate and coupled to a first end of the primary winding group;

a second input terminal disposed on the substrate and coupled to a second end of the primary winding group; and a first output terminal and a second output terminal disposed on the substrate and coupled to a first end and a second end of the secondary winding group, respectively, wherein the plurality of transformers are interposed on the substrate between the first input terminal and the first and second output terminals, and wherein the second input terminal is disposed on the substrate such that the plurality of transformers are interposed between the second input terminal and the first input terminal.

2. A transformer module comprising:

a substrate;

a primary winding group mounted on the substrate and forming primary windings of a plurality of transformers coupled that are in series or parallel with each other;

a secondary winding group mounted on the substrate and forming secondary windings of the plurality of transformers that are coupled in series or parallel with each other;

a first input terminal disposed on the substrate and coupled to a first end of the primary winding group;

a second input terminal disposed on the substrate and coupled to a second end of the primary winding group; and a first output terminal and a second output terminal disposed on the substrate and coupled to a first end and a second end of the secondary winding group, respectively, wherein the plurality of transformers are interposed on the substrate between the first input terminal and the first and second output terminals, and wherein the second input terminal is disposed on the substrate such that the plurality of transformers are interposed between the second input terminal and the first and second output terminals.

3. The transformer module according to claim 1, wherein the plurality of transformers are arranged and mounted on the substrate in m rows and n columns, where m and n are each integers of at least 2.

4. The transformer module according to claim 3, wherein there is a maximum distance between the 1st input terminal and the 1st and second output terminals.

5. The transformer module according to any claim 1, further comprising:

a rectifying/smoothing circuit disposed on the substrate and coupled to the first and second output terminals; and a load supplying circuit disposed on the substrate and configured to supply an output voltage/current that has been rectified and smoothed by the rectifying/smoothing circuit to a load circuit, wherein the rectifying/smoothing circuit and the load supplying circuit are disposed provided at positions on the substrate such that the plurality of transformers and the first and second output terminals are interposed between the first input terminal and at least one of the rectifying/smoothing circuit and the load circuit.

6. The transformer module according to claim 1, wherein the plurality of transformers are arranged in a first direction on the substrate between the first input terminal and the first and second output terminals, and wherein each of the plurality of transformers has a winding axis that is aligned with the first direction.

7. The transformer module according to claim 1, wherein the plurality of transformers are arranged in a first direction on the substrate between the first input terminal and the first and second output terminals, and wherein each of the plurality of transformers has a winding axis that is orthogonal to the first direction.

8. The transformer module according to claim 1, wherein the plurality of transformers includes a first transformer with terminals of the primary winding being a same polarity as terminals of the secondary winding, and a second transformer with terminals of the primary winding being an opposite polarity as terminals of the secondary winding.

9. A transformer module comprising:

a substrate;

a primary winding group mounted on the substrate and forming primary windings of a plurality of transformers that are coupled in series or parallel with each other;

a secondary winding group mounted on the substrate and forming secondary windings of the plurality of transformers that are coupled in series or parallel with each other;

a first input terminal and a second input terminal disposed on the substrate and coupled to a first end and a second end of the primary winding group, respectively; and a first output terminal and a second output terminal disposed on the substrate and coupled to a first end and a second end of the secondary winding group, respectively, wherein the plurality of transformers are interposed on the substrate between the first and second input terminals and the first output terminal and between the first output terminal and the second output terminal.

10. The transformer module according to claim 9, wherein the plurality of transformers are arranged in a first direction on the substrate between the first and second input terminals and the first output terminal, and wherein each of the plurality of transformers has a winding axis that is aligned with the first direction.

11. The transformer module according to claim 9, wherein the plurality of transformers are arranged in a first direction on the substrate between the first and second input terminals and the first output terminal, and wherein each of the plurality of transformers has a winding axis that is orthogonal to the first direction.

12. The transformer module according to claim 9, wherein the plurality of transformers includes a first transformer with terminals of the primary winding being a same polarity as terminals of the secondary winding, and a second transformer with terminals of the primary winding being an opposite polarity as terminals of the secondary winding.

* * * * *